United States Patent

[11] 3,624,311

[72] Inventor Bernard M. Van Emden
Los Angeles, Calif.

[21] Appl. No. 791,680
[22] Filed Jan. 16, 1969
[45] Patented Nov. 30, 1971
[73] Assignee Advance Data Systems Corporation
Beverly Hills, Calif.

[54] CARD HANDLER HAVING ROTATABLE MAGNETIC HEAD AND CARD-CLAMPING MEANS CARRIED BY HOUSING ASSEMBLY
12 Claims, 7 Drawing Figs.

[52] U.S. Cl. ..... 179/100.2 T, 235/61.7 B, 340/149 A
[51] Int. Cl. ..... G11b 5/80, G11b 25/04
[50] Field of Search ..... 179/100.2 T, 100.2 E, 100.2 MI, 100.4 R; 340/149 A, 174.1 F, 174.1 G, 174.1 H; 235/61.11 D, 61.7 B; 73/156

[56] References Cited

UNITED STATES PATENTS

| | | | |
|---|---|---|---|
| 2,714,201 | 7/1955 | Whitehead | 340/149 A |
| 2,914,746 | 11/1959 | James | 179/100.2 T |
| 3,042,299 | 7/1962 | Sherman | 235/61.11 D |
| 3,132,241 | 5/1964 | Wolfheimer | 340/149 A |
| 2,750,449 | 6/1956 | Thompson et al. | 179/100.2 T |

*Primary Examiner*—Bernard Konick
*Assistant Examiner*—Alfred H. Eddleman
*Attorneys*—Alan C. Rose, Ronald W. Reagin, John G. Mesgros, Lawrence V. Link, Jr. and Alfred B. Levine

ABSTRACT: A card handler for reading information from, and writing information onto, a card or credential. The handler includes a housing assembly in which magnetic read/write heads are rotatably mounted; a card holder assembly; pressure pads carried by the housing assembly so as to encompass the path of rotary motion of the magnetic heads; and means for moving the housing assembly and the pressure pads so as to clamp the card between the pads and the card holder assembly, with the heads in operative proximity to the card.

INVENTOR.

BERNARD M. VAN EMDEN

BY

Lawrence P. Link, Jr.

ATTORNEY

INVENTOR.
BERNARD M. VAN EMDEN
BY
Lawrence V. Link Jr.
ATTORNEY

INVENTOR.
BERNARD M. VAN EMDEN
BY Lawrence V. Link Jr.
ATTORNEY

CARD HANDLER HAVING ROTATABLE MAGNETIC HEAD AND CARD-CLAMPING MEANS CARRIED BY HOUSING ASSEMBLY

BACKGROUND OF THE INVENTION

The invention relates to a card handler for reading information from, and writing information onto, a card, badge or credential. More particularly the subject invention relates to a novel card handler for providing reliably magnetic recording and reading operations on a stationary card or credential.

In numerous applications, such as personnel identification, merchandise inventory, or material processing recordation, it is desirable to store, read and update magnetic information on cards, credentials and badges. For example in personnel identification systems, access to a secured facility may be determined by magnetically encoded data on a badge. In certain type security entrance systems the data on the badge may be first checked against a stored code and if acceptable, access is allowed and a new code may be recorded for entry to the facility during a subsequent time period. In material inventory and processing applications, data concerning the inventory level or the processing history, respectively, of an item may be conveniently recorded on a magnetic card.

Further in many applications it has been determined that the speed and reliability of the overall system operation may be improved if the card or credential is held stationary and the magnetic read/write heads moved relative thereto. This arrangement provides improved system performance by allowing the card or credential to remain in the continuous possession of the person to be identified or the operator. However since magnetic cards or credentials must be laminated to resist wear, they are relatively stiff and have a tendency to develop a curl or bend due to normal handling, for example from being carried in a billfold. Any curl, bend or other irregularities in the surface of the card tend to cause the magnetic read/write heads to "fly," i.e. vary the spacing between the heads and the card, as the heads are moved across the surface of the card at reasonable speeds. Any such variation in the spacing between the read/write heads and the card is undesirable and may result in unreliable and unpredictable magnetic reading and writing of data.

SUMMARY OF THE INVENTION

According to one preferred embodiment, the subject invention includes a card handler for reading and writing magnetic information on a card or credential. The card handler comprises a card holder, a clamping mechanism operable for clamping the card against the card holder, and rotatably mounted magnetic read/write heads. The clamping mechanism includes pressure pads for engaging the card on opposite sides of the path of movement of the read/write heads so as to reduce any bend or curl in the portion of the card adjacent the read/write heads. Means are provided for simultaneously actuating the clamping mechanism and for positioning the read/write heads into operative proximity with the card during the read/write portion of the operation of the system.

Accordingly it is an object of the subject invention to provide a card handler which provides improved magnetic reading and writing operations upon a stationary card, badge or credential.

Another object is to provide a card handler for recording magnetic information on a card or badge and which reduces variations in the spacing between the card and the read/write heads by reducing surface irregularities in the area of the card adjacent the read/write heads.

A further object of the invention is to provide a card handler of increased reliability and efficiency for recording magnetic information in a circular pattern on a stationary card.

BRIEF DESCRIPTION OF THE DRAWINGS

The novel features which are believed to be characteristic of the invention, both as to its organization and method of construction and operation, together with further objects and advantages thereof will be better understood from the following description taken in conjunction with the accompanying drawings in which illustrative embodiments of the invention are disclosed. It is expressly understood, however, that the drawings are for the purpose of illustration and description only and do not define limitations of the invention.

In the drawings.

DESCRIPTION OF THE PREFERRED EMBODIMENT

Figure 1:
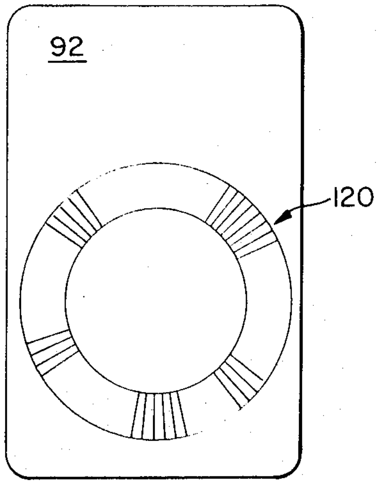
FIGS. 1 and 2 are front and side views respectively of a magnetic card or badge that may be utilized in conjunction with the card handler of the subject invention.

Reference is first directed primarily to FIGS. 3 through 6 which show one preferred embodiment of a card handler 20 in accordance with the subject invention. The handler 20 includes a generally cylindrical housing assembly 22 which is rigidly mounted on a cradle 24. Protruding side edges or tongues 25 and 26, formed on the base of the cradle 24, are slidably mounted in grooves or channels 27 and 28, respectively, in a bottom frame member 30. A bracket 34 is rigidly attached to the underside of the center of the cradle 24 and is connected to a plunger 36, of solenoid 38, by means of a connecting rod 32.

A card holder assembly 40 is bolted to one end of the bottom frame member 30 and includes a backplate 42, a throat inlet guide 44, an erase coil 46, and a plunger-actuated switch 48. Spring 47 is connected, under tension, between the bracket 34 and a pin 49, which pin is attached to the lower section of the backplate 42. When the solenoid 38 is not energized the spring 47 holds the housing assembly 22 in the closed (forward) position shown in FIG. 5. A rear frame plate 51 is bolted to the other end of the bottom frame member 30.

Shaft 50 is rotatably mounted within the housing assembly 22 and the shaft is driven by a motor 52 through a speed-reduction gear assembly comprising gears 54 and 56.

The end of the shaft 50 remote from the gear 54, has first and second sections 58 and 60 respectively of reduced diameter, and a slot 62 extends through these sections. A bifurcated or U shaped read/write assembly 64 is mounted on the first reduced section 58 of the shaft 50 between a spring 66 and a retaining ring 68. Read/write assembly 64 is retained against rotation with respect to the shaft 50 by a pin 70, but is allowed axially limited movement against the retaining pressure of the spring 66. The circumferential spacing between the shaft 50 and the read/write assembly 64 is such as to permit a selected amount of lateral motion of the read/write assembly.

Figure 7:
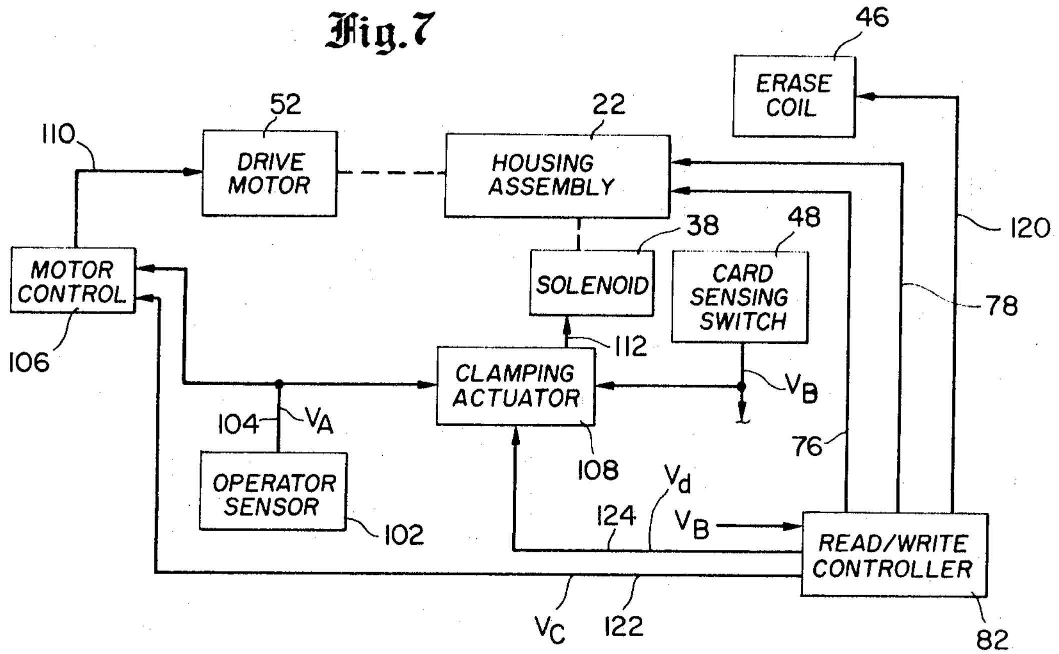
FIG. 7 is a block diagram depicting a recordation system incorporating the ticket handler of the subject invention.

Magnetic read and write heads 72 and 74 are mounted in opposite arms of the read/write assembly 64 and are coupled by leads 76 and 78, respectively, through a suitable assembly such as a slipring assembly or a rotary transformer assembly (not shown) to an output cable 80 and thereby to a suitable source of read and write signals, such as read/write controller 82 (FIG. 7).

A pressure ring or pad 84 is mounted on the second section 60 of the shaft 50, between a disc spring 86 and a retaining ring 88. Limited axial movement is allowed pressure ring 84 in response to pressure of the spring 86, and the ring is free to rotate on the shaft.

A grommet or second pressure pad 90 covers the end casing of the housing assembly 22 remote from the gear 54. The grommet 90 and the pressure pad 84 may be constructed of any suitable resilient material such as rubber or plastic.

Figure 2:
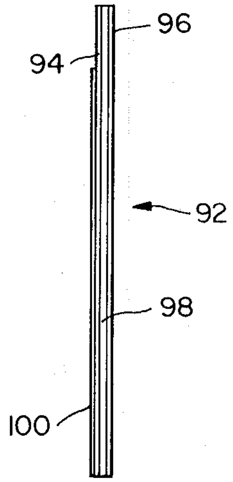
Figure 3:
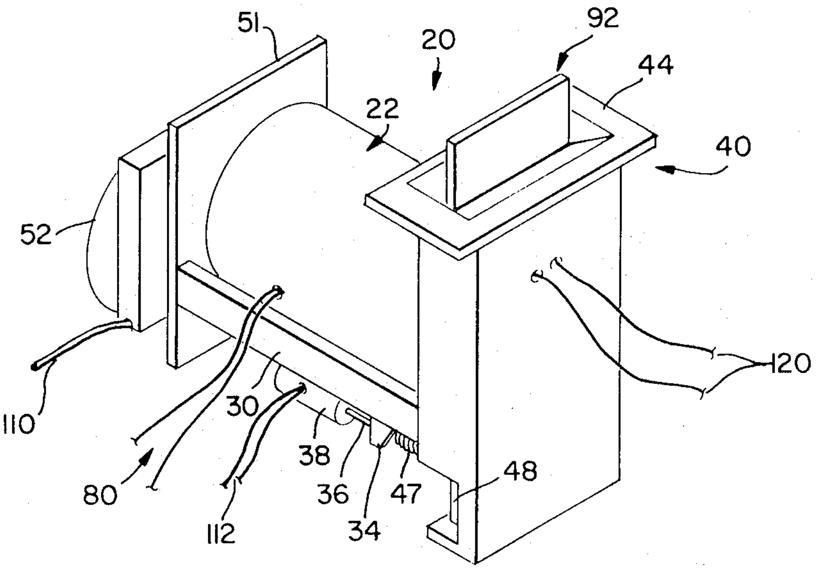
FIG. 3 is a perspective view of one preferred embodiment of a card handler in accordance with the principles of the subject invention.

A card, badge or credential 92 which may be utilized in conjunction with the card holder 20, of the subject invention, is shown in FIGS. 1 and 2. The card 92 may comprise front and rear layers 94 and 96 respectively of any suitable material, such as polyvinyl chloride for example. A stiffener layer 98, such as a section of hard cardboard is disposed between the front and rear layers 94 and 96. A layer 100 of magnetic recording material is applied to the front surface of the layer 94. Information relative to the card holder or the item being processed, may be printed on the rear surface of the stiffener layer 98.

Figures 4, 5, 6:
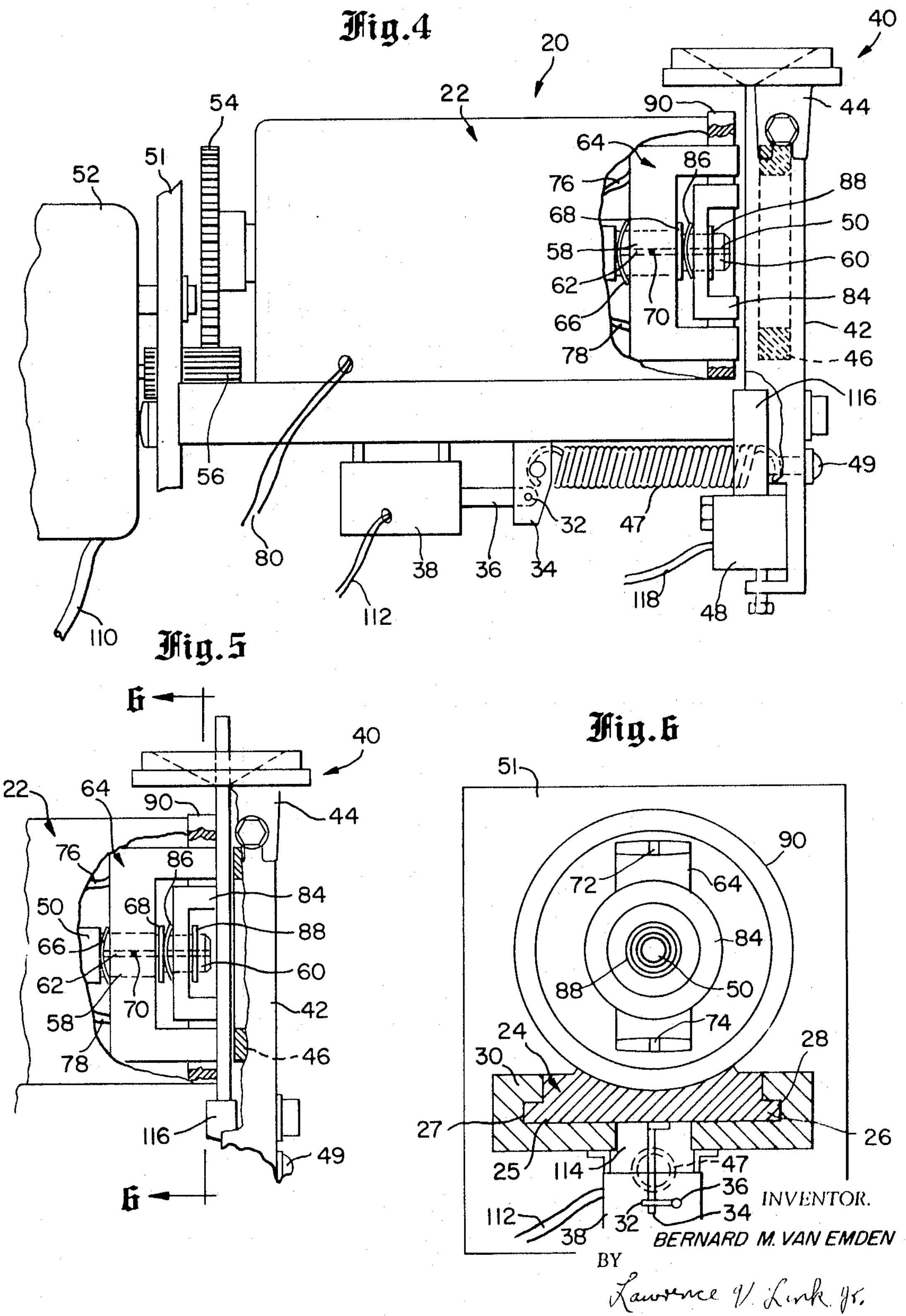
FIG. 4 is a fragmentary side view, partially cut away, of the card handler of FIG. 3 with the clamping mechanism shown in the retracted position.
FIG. 5 is a fragmentary side view, partially cut away, of the card handler with the clamping mechanism shown in the closed position.
FIG. 6 is a vertical sectional view taken on the line 6—6 of FIG. 5.

It is noted that prior to the operation of the system, the housing assembly 22 is held in the forward (closed) position by the spring 47, as depicted in FIG. 5. This feature not only improves the reliability of the system by preventing the entry of dust or other foreign objects when it is not in use, but also provides some assurance that the apparatus will not be utilized when a malfunction such as a power failure is present.

The operation of the card handler in accordance with the subject invention may be better understood with reference to the functional block diagram of a system incorporating the card handler as shown in FIG. 7. Referring now primarily to FIG. 7, upon the approach of a person to the station incorporating the card handler 20, a sensing device 102 provides a signal $V_A$ on the lead 104. The signal $V_A$ is applied to a motor control unit 106 and to a clamping actuator unit 108. The operator sensor 102 may be any suitable device capable of performing the function herein described therefore, such as a treadle or an electric-eye detection system. In response to the signal $V_A$ the motor control unit 106 energizes the motor 52 by applying power to the cable 110; and the clamping actuator 108 energizes the solenoid 38 by applying power to the cable 112. Thus the read/write assembly 64 is rotated in response to the drive motor 52; and the housing assembly 22 is moved to the retracted position (FIG. 4) in response to the plunger 36 moving the bracket 34 in the slot 114. It is noted that the bracket 34 is rigidly attached to the cradle 24 which carries the housing assembly 22. It is further noted that in the gear arrangement coupling the motor 52 to the shaft 50, that the gear 54 is so mounted as to be slideable axially on the gear 56 in response to actuation of the solenoid 38.

Insertion of the card 92 into the card holder assembly 40 depresses the plunger 116 of the switch 48 producing thereby a signal $V_B$ on the lead 118. In response to the signal $V_B$, the clamping actuator 108 deactivates the solenoid 38, and the read/write controller 82 is activated.

In FIG. 1, at reference numeral 120, is shown one form of magnetic recording pattern which may be used to store encoded information on the card 92. The actual recording pattern would of course not be visible, but has been depicted in FIG. 1 for the purposes of explanation. The coded pattern may consist of orienting the magnetic domains of the material of layer 100 in either of a first or a second direction. The method of controlling the current in the write head 74, and of sensing the magnetic pattern by current induced into read head 72, as the read/write assembly 64 is rotated adjacent to or in contact with the card 92, is well known in the art and hence will not be explained in detail herein. The read/write controller 82 may incorporate the necessary logic circuitry to check the validity of a stored code previously written onto the card 92 and to then erase the card by applying a signal through leads 120, which leads are connected to the erase coil 46.

It is important to note that upon the insertion of the card 92 into the card holder assembly 40, that the first pressure pad or ring 84 and the second pressure pad or grommet 90 clamp against the surface of the card so as to enclose the path of rotation of the read/write heads. This clamping action, according to one of the primary objects of the invention, presses the card against the front surface of the backplate 42 thus reducing any bend or curl in the card. As explained previously this clamping action improves the efficiency and accuracy of the read/write operation by preventing the heads from "flying" over different portions of the card, that is it reduces the variation in the spacing between the heads and the card. Further the clamping feature may be used in conjunction with the read/write controller unit 82 to retain the card if it has been determined to contain an improper code.

Upon completion of an acceptable read/write cycle, the read/write controller 82 applies a signal $V_C$ to a lead 122. The signal $V_C$ unlatches the motor control unit 106. The read/write controller 82 also applies a signal $V_D$ to the lead 124. The signal $V_D$ may consist of a pair of pulses of first and second plurality separated by an appropriate time interval such as 30 seconds for example. In response to the signal $V_D$ of the first plurality the clamp actuator 108 latches, causing the housing assembly 22 to assume the open position so that the card 92 may be removed. In response to the signal $V_D$ of the second polarity, the clamping actuator 108 unlatches allowing the assembly 22 to be moved to the closed position in response to the spring 47; thus completing an operation sequence of the card handler 20.

Thus there has been described a novel and improved card holder for reading, writing and updating magnetic information on a card, badge or credential. The card handler embodiment described herein incorporates novel clamping means for reducing variations in the spacing between the card and the read/write heads by reducing surface irregularities in the card in the areas thereof adjacent the read/write heads.

It is understood that the above-described arrangement is illustrative of the application of the principles of the invention and that numerous other arrangements may be devised by those skilled in the art without departing from the scope and the spirit of the invention. Accordingly, it is understood that the present invention is only to be limited by the spirit and scope of the appended claims.

What is claimed is:

1. In a system for reading or writing information on a magnetic card:
   - card-holding means for receiving said card,
   - a clamping mechanism,
   - means for moving said clamping mechanism into engagement with said card,
   - a magnetic head,
   - means for moving said magnetic head across the surface of said card,
   - a housing assembly, and a magnetic head assembly, and wherein said card-holding means includes a card holder assembly, said magnetic head is mounted on the magnetic head assembly which is rotatably mounted within said housing assembly, said clamping mechanism includes pressure pads carried by said housing assembly, and said means for moving said clamping mechanism comprises means for moving said housing assembly and said pressure pads to clamp the card between said pads and said card holder assembly with said head in operative proximity with the card.

2. The device of claim 1 wherein said pressure pads are mounted to said housing assembly so as to enclose the path of rotary motion of said magnetic head.

3. The device of claim 1 wherein said card holder assembly includes an erase coil disposed therein in alignment with said magnetic head assembly.

4. The device of claim 1 wherein said means for moving said housing assembly comprises a spring device connected between said card holder assembly and said housing assembly, and a solenoid coupled to said housing assembly.

5. The device of claim 1 further comprising a shaft journaled in said housing assembly, means for securing said magnetic head assembly for rotation with said shaft while permitting relative axial movement thereof, and a tension device disposed along said shaft and acting between said head and said shaft.

6. The device of claim 5 wherein one of said pressure pads is rotatably mounted on said shaft; and further comprising a spring device mounted on said shaft and acting between said pressure pad and said shaft.

7. The device of claim 6 wherein another of said pressure pads is mounted on the casing of said housing assembly.

8. The device of claim 1 further comprising means for sensing the approach of a person; and power means for rotating said magnetic head assembly; said power means being activated by said sensing means.

9. The device of claim 8 wherein said means for moving said housing assembly responds to said sensing means to move the housing assembly away from said card holder assembly and permit insertion of a card.

10. The device of claim 9 wherein said card holder assembly includes a card-sensing device; and said means for moving said housing assembly into engagement with said card, responds to said card-sensing device for positioning said pressure pads to clamp the card between said pads and said card holder assembly and for positioning said head in operative proximity with the card.

11. The device of claim 10 further comprising means for applying read/write electrical signals to said magnetic head assembly.

12. The device of claim 11 further comprising means for sensing the end of an acceptable read/write cycle; and means for deactivating said power means; wherein said means for moving said housing assembly responds to said read/write-cycle-sensing means to move said housing assembly out of engagement with said card to permit removal of said card, and said power deactivation means is controlled by said read/write-cycle-sensing means.

* * * * *